United States Patent
Boettcher et al.

(10) Patent No.: US 11,180,683 B1
(45) Date of Patent: Nov. 23, 2021

(54) IGNITION-SUPPRESSING TAPE AND METHOD OF INSTALLATION

(71) Applicant: The Boeing Company, Chicago, IL (US)

(72) Inventors: Philipp A. Boettcher, Golden, CO (US); Mark O'Masta, Oak Park, CA (US); Christopher S. Roper, Oak Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/877,414

(22) Filed: May 18, 2020

(51) Int. Cl.
| | |
|---|---|
| *B29C 65/50* | (2006.01) |
| *C09J 7/22* | (2018.01) |
| *C09J 7/38* | (2018.01) |
| *A62C 3/00* | (2006.01) |
| *C09J 7/50* | (2018.01) |
| *C09J 5/00* | (2006.01) |

(52) U.S. Cl.
CPC ................... *C09J 7/50* (2018.01); *A62C 3/00* (2013.01); *B29C 65/5021* (2013.01); *C09J 5/00* (2013.01); *C09J 7/22* (2018.01); *C09J 7/38* (2018.01); *C09J 2301/416* (2020.08); *C09J 2400/24* (2013.01); *C09J 2481/003* (2013.01); *Y10T 428/14* (2015.01); *Y10T 428/28* (2015.01)

(58) Field of Classification Search
CPC ......... C09J 7/50; C09J 7/38; C09J 7/22; C09J 5/00; C09J 2301/416; C09J 2400/24; C09J 2481/003; A62C 3/00; B29C 65/5021; Y10T 428/28; Y10T 428/14

See application file for complete search history.

(56) References Cited

U.S. PATENT DOCUMENTS

| | | | |
|---|---|---|---|
| 4,519,974 A | 5/1985 | Bravenec et al. | |
| 4,826,380 A | 5/1989 | Henry | |
| 7,425,604 B2 | 9/2008 | Cosman et al. | |
| 7,438,974 B2 | 10/2008 | Obuhowich | |
| 8,900,496 B2 | 12/2014 | Kovach et al. | |
| 2003/0211291 A1* | 11/2003 | Castiglione | B32B 7/02 428/172 |
| 2005/0287361 A1* | 12/2005 | Garcia-Ramirez | C09J 7/241 428/343 |
| 2007/0207284 A1* | 9/2007 | McClintic | B32B 27/08 428/40.1 |
| 2010/0107513 A1 | 5/2010 | Buchanan et al. | |

OTHER PUBLICATIONS

PPG Aerospace Sealants "Customized Sealant Solutions PRC Seal Caps" Technical Data Sheet, issued May 2017, from http://www.ppgaerospace.com/getmedia/9a234ec3-1db9-48de-94f7-c212ac2ba705/SealCapFlyer.pdf.aspx, 2 pages.

* cited by examiner

*Primary Examiner* — Patricia L. Nordmeyer
(74) *Attorney, Agent, or Firm* — MH2 Technology Law Group LLP

(57) ABSTRACT

An ignition-suppressing tape for sealing cut edges of polymer panels, the tape having a backing strip and a sealant strip that is disposed on a portion of a surface of the backing strip, and a pressure sensitive adhesive is disposed on other portions of the same surface of the backing strip.

20 Claims, 5 Drawing Sheets

IGNITION-SUPPRESSING TAPE AND METHOD OF INSTALLATION

TECHNICAL FIELD

The subject matter described herein relates generally to polymer panel edge sealants and, more particularly, to adhesive tapes for sealing cut edges of polymer panels used in various industries, including aerospace, chemical manufacturing and processing plants, oil and gas industry, farming, and other industries.

BACKGROUND

Conductive panels are used in the aerospace industry on aircraft such as commercial and/or military aircraft where such panels can be used in, for example, fuel tanks. Conductive panels are also used in the chemical manufacturing and processing plants, and in the oil and gas industry where they are used, for example, in tanks containing flammable oil and/or gaseous mixtures and/or flammable aerosolized mixtures. In addition, conductive panels are used in the farming industry for grain storage units. Using the aerospace industry as an example, on an aircraft, high electrical current may propagate through conductive paths, particularly during a lightning strike on the aircraft. Fiber ply layup that is inherent to composite materials that are used in modern aircraft designs, such as carbon fiber reinforced polymers, creates potentially conductive paths on an aircraft, and allows the high electrical current to travel through certain locations of the electrically resistive polymers between fiber plies. When high electrical current travels through the electrical resistive polymer, such as between carbon fiber reinforced polymer fiber plies, the current may vaporize material from the composite panels. If this occurs sufficiently close to a cut edge of the polymer panels, vaporizing material from the cut edge may result in the expulsion of hot gas and particles of hot and potentially burning material. If this expulsion of material occurs close to the cut edges of polymer that are exposed inside the fuel tank, even in the hundreds of thousands of inches from the edges, it may cause an ignition risk to the aircraft's fuel tanks that combust flammable gaseous mixtures in the fuel tank's ullage.

Some of the conventional ways of sealing exposed cut edges of the polymer panels are, for example, by using a polysulfide sealant to form edge seals. However, applying the conventional polysulfide sealant to the edges require numerous labor-intensive and time-consuming steps, such as brush coating, hand application of the liquid sealant, and curing of the liquid sealant. Other conventional ways include using pure strips of uncured sealant to seal the cut edges that do not include a structural hold to keep the uncured sealant in place, and using a caulking style of seal that requires the manual extrusion of uncured sealant onto the cut panel edges, which are labor intensive and prone to human error. Therefore, there is a continuous need for improvements on providing more effective seals and more efficient ways of sealing the cut edges of the electrically resistive polymer panels on tanks that may include flammable materials.

SUMMARY

The following presents a simplified summary in order to provide a basic understanding of some aspects of one or more examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

The present disclosure provides an ignition-suppressing tape that includes a backing strip and a sealant strip. The sealant strip is disposed on a portion of a surface of the backing strip, and the surface of the backing strip includes a pressure sensitive adhesive that is disposed on other portions of the surface on the backing strip.

The present disclosure also provides a method of installing an ignition-suppressing tape that includes steps of cleaning the installation surface that includes a cut edge and adjacent uncut surfaces of a polymer panel; selecting an ignition-suppressing tape with an appropriate geometry, the ignition-suppressing tape includes a backing strip and an uncured sealant strip disposed on a surface of the backing strip; positioning the ignition-suppressing tape onto the installation surface; waiting for the uncured sealant to cure on the installation surface; and inspecting the installed ignition-suppressing tape.

BRIEF DESCRIPTION OF THE DRAWINGS

The accompanying drawings, which are incorporated in and constitute a part of this specification, illustrate examples of the present teachings and together with the description, serve to explain the principles of the disclosure. In the figures.

Figure 1A:
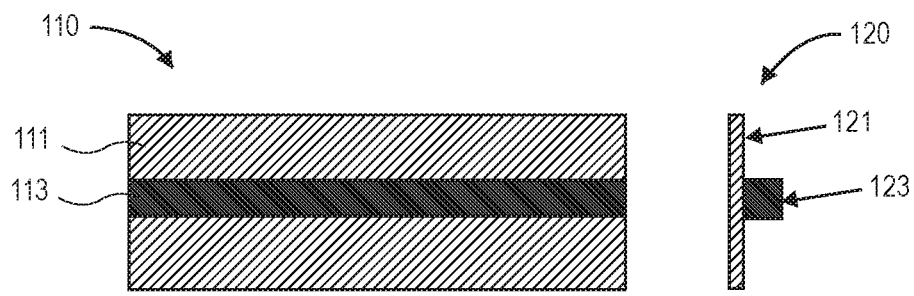
FIG. 1A is a schematic drawing of a plan view and a cross-sectional view of an ignition-suppressing tape.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to the present examples, examples of which are illustrated in the accompanying drawings. Wherever possible, the same reference numbers will be used throughout the drawings to refer to the same or like parts.

The ignition-suppressing tape described herein is a strip product that can be utilized for sealing edges of polymer panels without the cumbersome conventional steps, such as hand application of a sealant onto the cut edges. The ignition-suppressing tape provides a strip product that can be cut to length and quickly applied as an adhesive tape. The tape includes a polysulfide sealant that cures in the desired location to form a polysulfide edge seal with reduced installation time as compared to the conventional methods. An alternative tape can also include an open cellular matrix to contain uncured polysulfide sealant on the strip product that simplifies application and clean-up of the uncured sealant during application.

The ignition-suppressing tape is a composite tape that includes a backing strip and an adhesive strip (herein also referred to as a sealant strip). The adhesive strip is provided on a partial region of one face of the backing strip. The ignition-suppressing tape is in a strip form, which can be easily manufactured on a conveyor style manufacturing. The ignition-suppressing tape can be formed in any geometry that is useful for sealing various types of cut edges, and the tape can also be cut to size as desired during installation of the tape.

More specifically, the ignition-suppressing tape has two major surfaces. The first surface of the tape is capable of being attached to a polymer panel, and includes a first surface of the backing strip that includes a sealant strip on at least part of the first surface of the backing strip. The second surface of the tape is an external surface and faces away from the polymer panel when the tape is attached to the panel. The external surface of the ignition-suppressing tape may be smooth in contour, which prevents the tape from falling off or breaking off from the panel edges. The tape can also be used to attach an edge of a metal panel to an edge of a polymer panel if the meal panel is adjacent to the polymer panel.

The backing strip includes a pressure sensitive adhesive, such as a type of glue, that is provided on at least part of one face of the backing strip. The pressure sensitive adhesive can be provided adjacent to the sealant strip on the same surface of the backing strip, such that the pressure sensitive adhesive ensures adherence of the tape to the polymer panels. For example, the pressure sensitive adhesive can be provided adjacent to and surrounding the sealant strip, on two lengthwise sides to the sealant strip, or at the ends of the backing strip that are located away from the sealant strip. The pressure sensitive adhesive can adhere to polymer panels, such as carbon fiber reinforced polymer (CFRP) panels, that are unprimed, primed, and/or painted. The pressure sensitive adhesive can additionally be removed from the polymer panels without damaging the surfaces of the unprimed, primed, and/or painted panels, such that no primer or paint is removed from the panels, and without leaving adhesive residues behind on the panels. A backing strip can also include pressure sensitive adhesive on parts of both faces of the backing strip to provide desired adherence capabilities of the tape onto a polymer panel.

The backing strip can be a plastic, an elastomer, a fiber reinforced plastic, a composite fiber reinforced plastic, or the like, or a combination thereof In embodiments, the backing strip can be a flexible backing strip that is made of a flexible material (such as a plastic, an elastomer, a mesh, a weave, or a fabric), a composite material (such as a fiber reinforced plastic), or a combination thereof. A thickness of the flexible backing strip can be between about 0.01 mm and about 1.5 mm, between about 0.02 mm and about 1 mm, or between about 0.05 mm and about 0.7 mm.

Alternatively, the backing strip can be an inflexible backing strip that is made of an inflexible material that can still be bent to conform to surfaces, such as a plastic or a composite fiber reinforced plastic material. A thickness of the inflexible backing strip can be between about 0.05 mm and about 10 mm, between about 0.1 mm and about 7 mm, or between about 0.5 mm and about 5 mm.

A peel strength of the backing strip is between about 0.5 pounds per inch width (lb/inch) and about 10 lb/inch, between about 0.7 lb/inch and about 7 lb/inch, or between about 1 lb/inch and about 5 lb/inch, based on the width of the backing strip on the ignition-suppressing tape. A tensile strength of the backing strip is less than about 30 lb/inch, less than about 25 lb/inch, or less than about 18 lb/inch, based on the width of the backing strip on the ignition-suppressing tape.

The sealant strip of the ignition-suppressing tape is provided on at least one region of one surface of the backing strip. The material of the sealant strip can be refrigeration and freeze resistant on the ground and in-flight, such as enduring temperatures of between about 45° F. and about −85° F., between about 32° F. and about −60° F., or between about 20° F. and about −40° F. The material of the sealant strip can also be heat resistant, such as enduring temperatures of between about 70° F. and about 300° F., between about 100° F. and about 250° F., or between about 160° F. and about 200° F.

The sealant material can include one of an uncured sealant, a fuel tank sealant, a solid-open cellular material, a composite formed by an uncured adhesive and a solid-open cellular material, or a combination thereof.

In embodiments, the sealant material can be a polysulfide rubber sealant, such as a polyurethane, polythioether, manganese dioxide cured polysulfides, -dichromate cured polysulfides, epoxy cured polythioethers, or the like, or a combination thereof.

The sealant strip can include the same material as the storage tank sealant, such as an aircraft fuel tank sealant that is used on the same aircraft, or can include an uncured polysulfide sealant. The sealant strip can alternatively include a solid-open cellular material, such as a flexible polymer foam or a polysulfide foam. The sealant strip can also be a composite formed by an uncured adhesive and a solid-open cellular material. The composite can be co-continuous or bi-continuous, and the pore size of the solid-open cellular material may be selected such that the uncured adhesive is retained within the solid-open cellular material by capillary pressure.

A pore size of the solid-open cellular material can be between about 2 nm and about 100 mm, between about 5 um and about 95 mm, or between about 5 um and about 90 mm. The maximum pore size may be less than about half of the thickness of the solid-open cellular material. Alternatively, the solid-open cellular material may have a bimodal pore distribution, having a first pore size of between about 0.05 mm and about 2 mm or between about 0.1 mm and about 1 mm, and a second pore size that is between about 1 and about 2 orders of magnitude smaller than the first pore size.

The composite of solid-open cellular material and uncured sealant can simplify application of the uncured sealant by providing more structure to the uncured sealant, and can reduce unwanted movement of the uncured sealant from the desired curing location, which avoid clean-up of uncured sealant that may have leaked towards undesired locations. The solid-open cellular material is also compatible with fuel tank material and fuel.

The solid-open cellular material can be made of a polyamide foam, a melamine foam, a polyimide foam, a PTFE foam, a polyamide0imide foam, a PEEK foam, a polyurethane foam, a polythioether foam, a polysulfide foam, or a combination thereof.

The sealant strip has two major surfaces, the first surface is in contact with a major surface of the backing strip such that the first surface of the sealant strip is attached to a surface of the backing strip, and the second surface of the sealant strip can be attached to a cut edge of the polymer panel. The sealant strip is provided on a region of the surface of the backing strip, on which there is an open region on the same surface of the backing strip that is not covered by the sealant strip. The sealant strip can be located on a middle region of the surface of the backing strip, and the open region is adjacent to the sealant strip. The pressure sensitive adhesive can be provided on at least one part of the open region on the surface of the backing strip, at least on two opposite sides of the sealant strip, at least two opposite ends of the backing strip, along the perimeter of the backing strip, or all of the open region on the backing strip.

A portion of the sealant strip can include an uncured sealant. After curing, the sealant bonds strongly to the polymer panel surface but does not bond strongly to the backing strip. Described in other words, the material of the sealant strip has a stronger bond to the polymer panel than to the backing strip, such that the backing strip can be removed from the sealant strip without damaging the sealant strip or leave behind a residue on the sealant strip, and the sealant strip stays attached to the edge of the polymer panel.

The surface area of a first surface of the backing strip can be at least 2 times of the surface area of the adhesive strip that is located on the first surface of the backing strip, at least 3 times of the surface area of the adhesive strip, or at least 5 times of the surface area of the adhesive strip.

The ignition-suppressing tape can be manufactured by providing a layer of the adhesive strip (or sealant strip) material onto a partial region of one surface of the backing strip using methods of extrusion or deposition, or by placing a preformed adhesive strip material onto one surface of the baking strip using mechanical methods.

The sealant strip of the ignition-suppressing tape includes a material that has a molecular weight of between about 1000 g/mol and about 2500 g/mol, between about 1500 g/mol and about 2300 g/mol, or from about 1800 g/mol to about 2000 g/mol. The peel strength of the sealant material of the sealant strip after curing on the polymer edges is between about 15 pounds per inch width (lb/inch) and about 60 lb/inch, between about 20 lb/inch and about 50 lb/inch, or between about 30 lb/inch and about 40 lb/inch, based on the width of the sealant strip on the ignition-suppressing tape. The sealant strip after curing has a peel strength that is larger than about 20 times greater than the peel strength of the backing strip, larger than about 10 times greater than the peel strength of the backing strip, or larger than about 4 times greater than the peel strength of the backing strip.

Figure 1B:
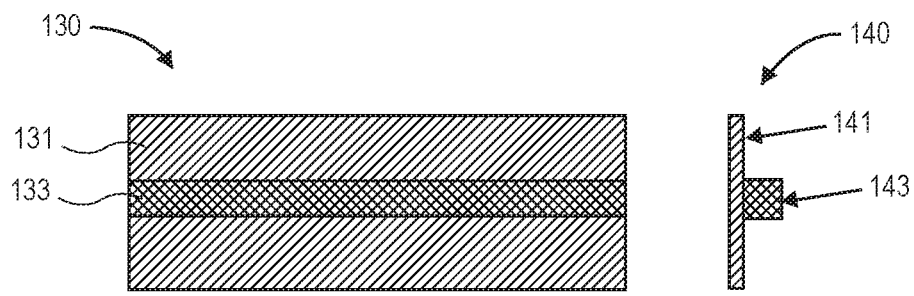
FIG. 1B is a schematic drawing of a plan view and a cross-sectional view of another ignition-suppressing tape.
Figure 1C:
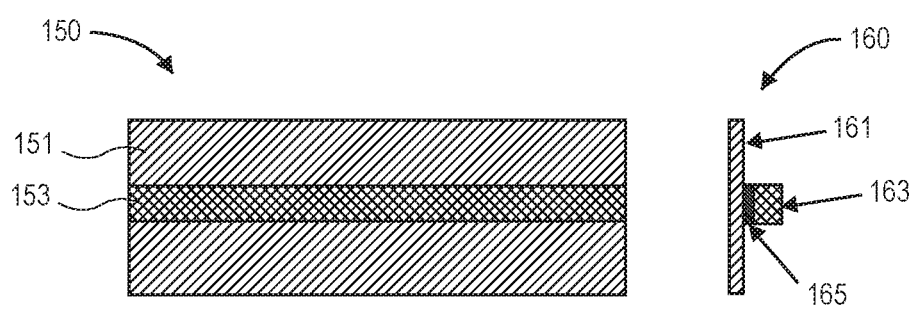
FIG. 1C is a schematic drawing of a plan view and a cross-sectional view of further another ignition-suppressing tape.

Some examples of the ignition-suppressing tape are shown in FIGS. 1A to 1C. FIG. 1A shows a plan view and a cross sectional view of an ignition-suppressing tape. The tape in plan view 110 shows a backing strip 111, and a sealant strip 113 that includes an uncured sealant and placed on the backing strip 111. The cross-sectional view 120 shows that the tape includes a backing strip 121, and an uncured sealant 123 that is provided on a portion of the first surface of the backing strip 121.

FIG. 1B shows another ignition-suppressing tape in plan view 130 that includes a backing strip 131, and a sealant strip 133 that includes a composite of a solid-open cellular material and an uncured sealant on the backing strip 131. The cross-sectional view of the tape 140 shows that the tape includes the backing strip 141, and the composite of a solid-open cellular material and uncured sealant 143 that is provided on a portion of the first surface of the backing strip 141.

Similarly, FIG. 1C shows an alternative ignition-suppressing tape in plan view 150 that includes a backing strip 151, and a sealant strip 153 that includes a composite of a solid-open cellular material and uncured sealant on the backing strip 151. The cross-sectional view of the tape 160 shows that the tape includes the backing strip 161, the composite of a solid-open cellular material and uncured sealant 163, and a cured sealant material 165 that is provided in between a first surface of the backing strip 161 and the uncured sealant 163. The cured sealant material 165 can be formed by the same base material as the uncured sealant 163. Alternatively, the cured sealant material 165 can be formed of other types of sealant material that differs from the uncured sealant 163. Alternatively, the cured sealant material 165 can include other material that aid in providing structural strength of the sealant after it is cured.

Although the sealant strips shown in the examples of FIGS. 1A to 1C are placed horizontally in the middle section of the surface of the backing strip, the sealant strips can also be placed in other horizontal positions on the backing strip that deviates from the middle section of the backing strip, in vertical positions along the surface of the backing strip, or other configurations that can be utilized to seal cut edges of polymer panels. The geometry of the ignition-suppressing tape can be changed as desired to provide the best seal to the polymer edge desired to be sealed. Examples are shown in FIGS. 2A and 2B.

Figure 2A:
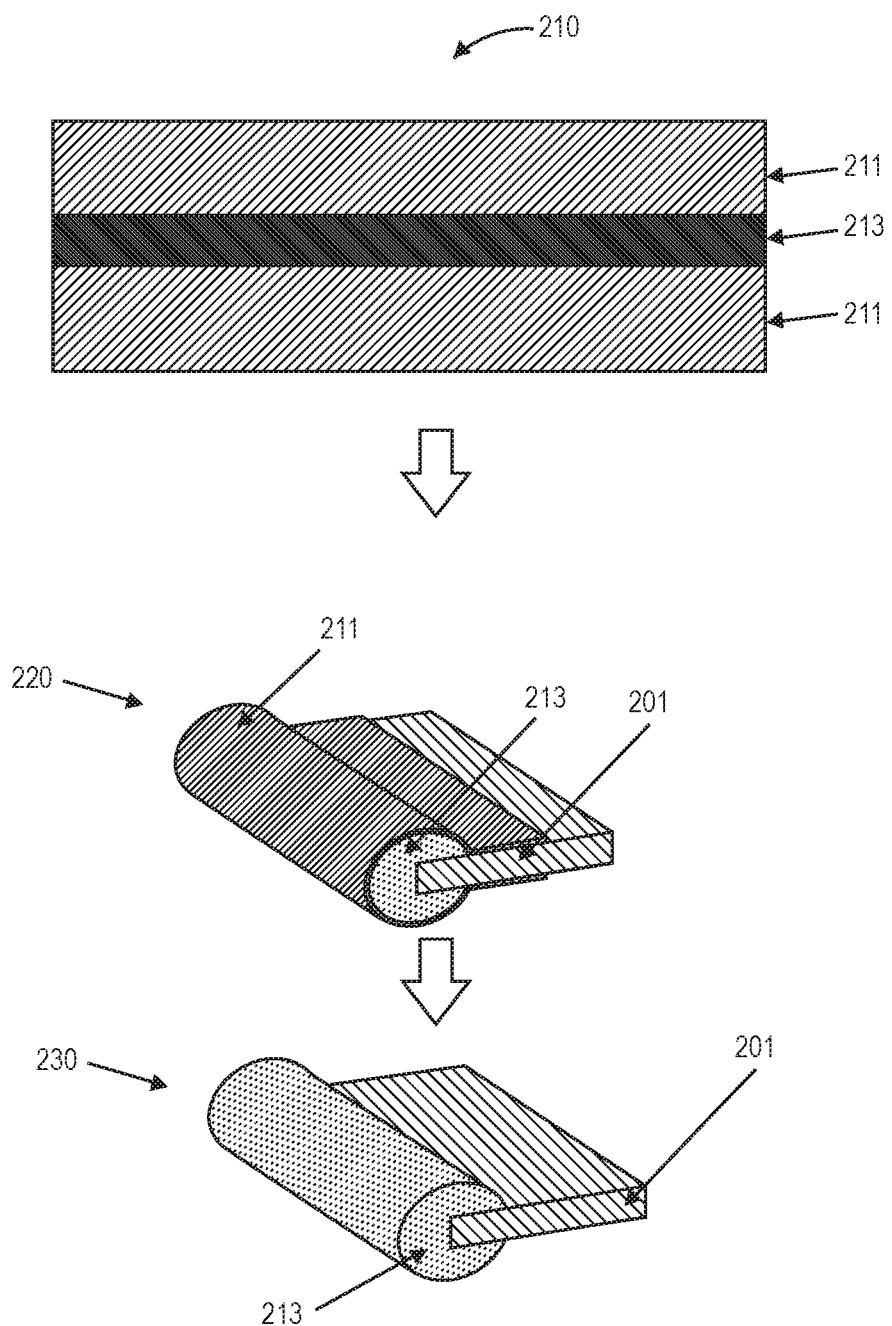
FIG. 2A is a schematic drawing of an ignition-suppressing tape that is used to seal an example cut edge of a polymer panel.

FIG. 2A shows an ignition-suppressing tape 210 that includes a sealant strip 213, which is disposed in a middle region of one surface of a backing strip 211. Step 220 of FIG. 2A shows how ignition-suppressing tape 210 can be used to seal an example edge of a polymer panel 201. With the sealant strip 213 placed at the edge of polymer panel 201, the tape 210 is secured to the panel 201 by backing strip 211, which provides additional support to sealant strip 213 by extending farther around the edge of the panel 201 than the sealant strip 213, and attach onto the uncut surfaces of the panel 201 adjacent to the cut edge. Step 230 of FIG. 2A shows that the backing strip 211 can be removed from the panel 201 and the sealant strip 213 after the sealant strip 213 is secured at the edge of the panel 201.

Figure 2B:
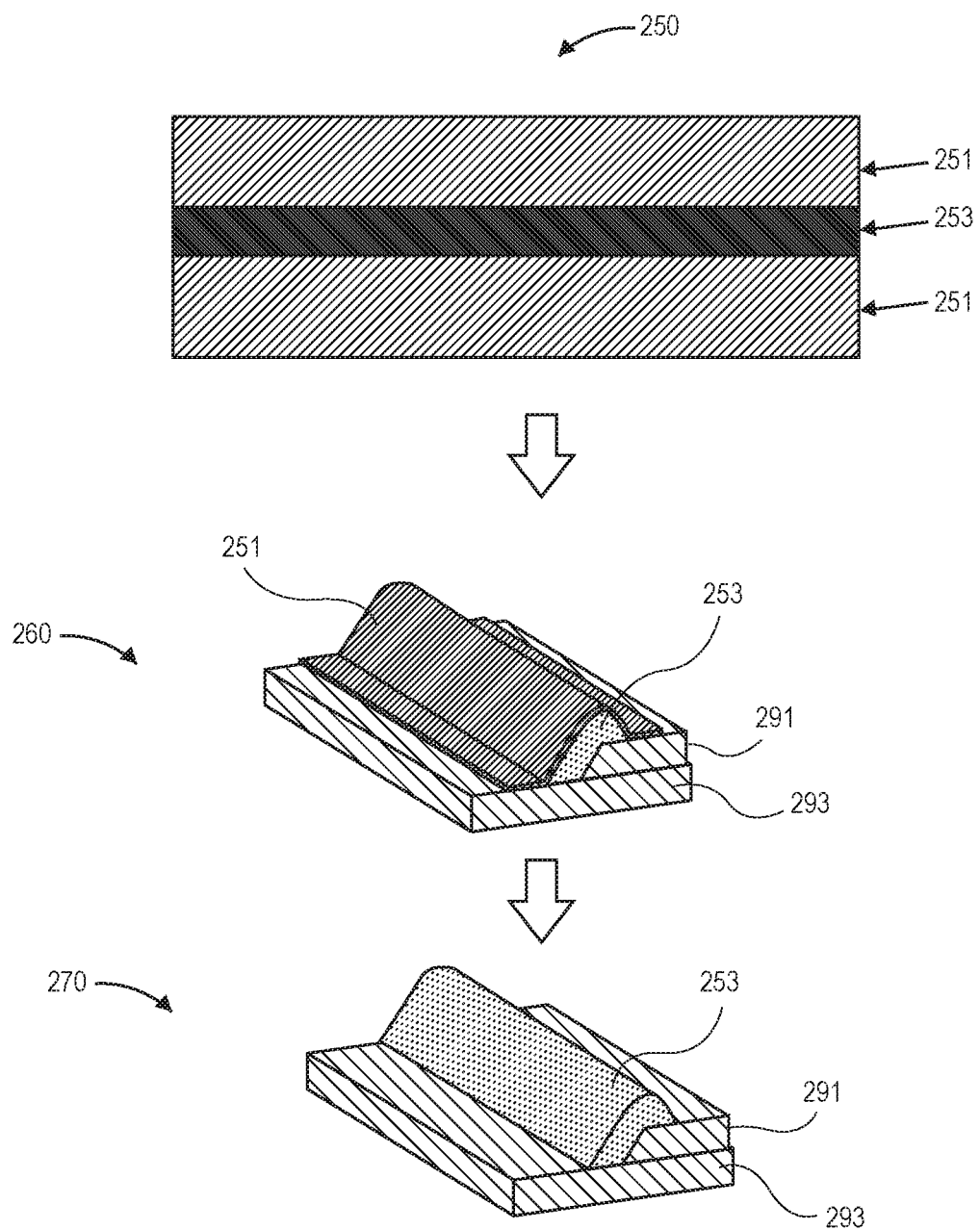
FIG. 2B is a schematic drawing of another ignition-suppressing tape that is used to seal an example overlapping cut edges of polymer panels.

FIG. 2B shows an alternative ignition-suppressing tape 250 that includes a sealant strip 253, which is disposed in a middle region of one surface of a backing strip 251. Step 260 of FIG. 2B shows how ignition-suppressing tape 250 can be used to seal an example overlapping edges formed by polymer panels 291 and 293. With the sealant strip 253 placed at and covering the overlapping edges of panels 291 and 293, step 260 shows how the tape 250 can be secured to the panels 291 and 293 by attaching one end of backing strip 251 to the adjacent uncut surface of polymer panel 291 and attaching the opposite end of backing strip 251 to the adjacent uncut surface of polymer 293 on opposite sides of the sealant strip 253. The backing strip 251 helps secure the sealant strip 253 onto the cut edges of panels 291 and 293. The backing strip 251 can also provide additional support to the sealant strip 253 as the uncured sealant strip is curing on the overlapping edges of the panels 291 and 293. Step 270 of FIG. 2A shows that the backing strip 251 can be removed from the panels 291 and 293 after the sealant strip 253 is secured at the edges of the panels 291 and 293.

As shown in FIGS. 1A to 1C and 2A to 2B, the sealant layer of the ignition-suppressing tape is provided with a sufficient thickness to ensure that the seal stays adhered to the edge of the polymer panel even after removal of the backing strip from the sealant strip and polymer panel. Thickness of the sealant strip provided on the backing strip is between about 0.001 inches and about 0.1 inches, between about 0.005 inches and about 0.07 inches, between about 0.02 inches and about 0.05 inch.

Figure 3A:
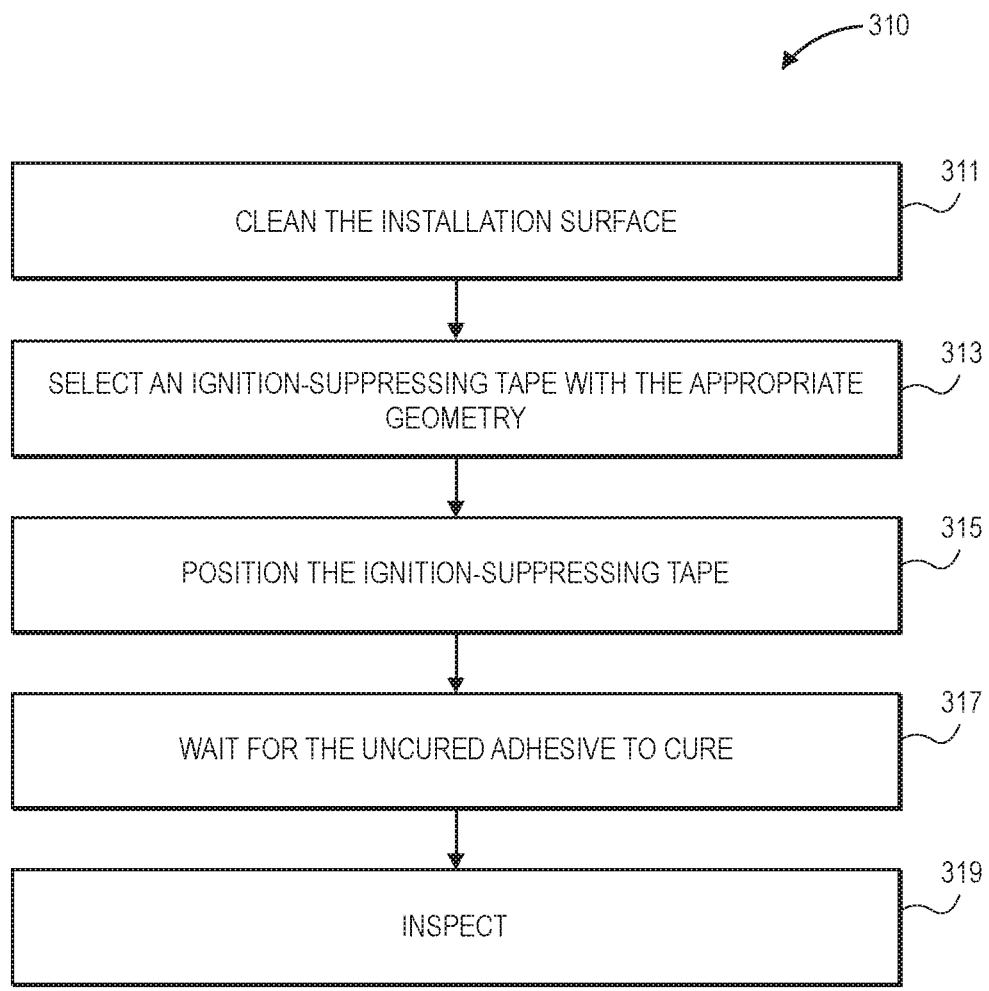
FIG. 3A is a flow diagram of a method of installing an ignition-suppressing tape onto a cut edge of a polymer panel.
Figure 3B:
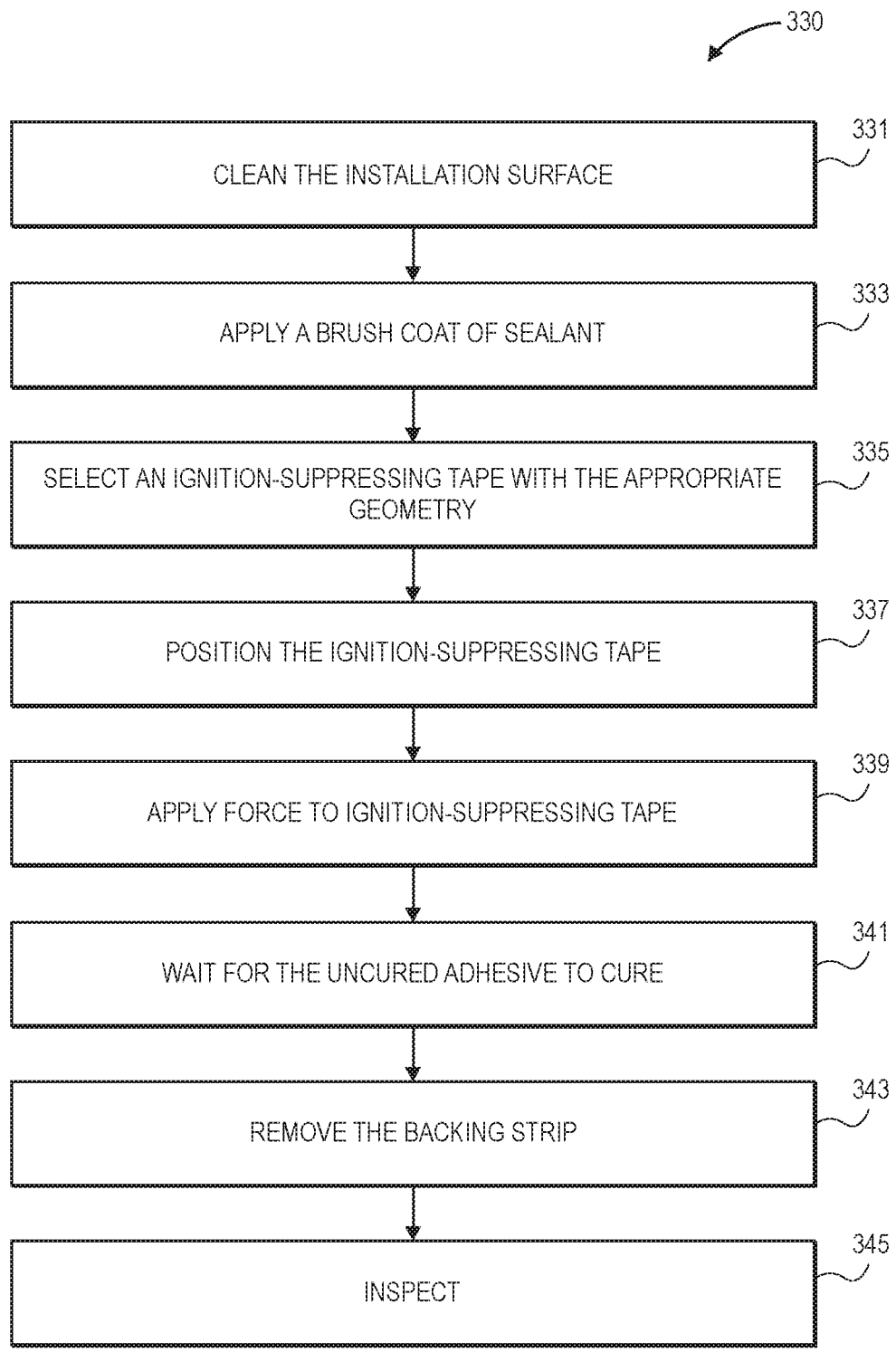
FIG. 3B is a flow diagram of an alternative method of installing an ignition-suppressing tape onto a cut edge of a polymer panel.

A method 310 of installing the ignition-suppressing tape onto cut edges of polymer panels is provided in FIG. 3A. The method 310 includes an initial cleaning of the installation surface 311, which includes the cut edge of the polymer panel and the adjacent uncut surfaces of the panel, to remove any chemical residue and particulates that may inhibit or reduce adhesion of the tape to the sealing location. Cleaning of the installation surfaces 311 can be done mechanically or by hand, and using water or with a solvent.

Then, selecting an ignition-suppressing tape with the appropriate geometry 313 to fit the edges of the desired installation location. The width of the sealant region of the tape can be selected to fully cover the cut edge desired to be sealed and also extends onto the adjacent uncut surfaces of the same polymer panel (see examples shown in FIGS. 2A and 2B). The length of the sealant region can be selected to cover either an entire length of the cut edge if appropriate, or can be selected to cover a shorter distance that is ergonomically and logistically easier to tape onto in a single operation than the entire length, such as selecting a shorter pre-cut strip or cutting a desired shorter length from a longer strip.

After selecting the tape in step 313, the ignition-suppressing tape is positioned 315 onto the desired cut edge of the polymer panel. The positioning of the tape involves placing the adhesive strip (or also referred to as the sealant strip) region of the tape onto the installation surface to cover both the cut edge and the adjacent uncut surfaces on either side of the cut edge, and at least one of the pressure sensitive adhesive regions on the backing strip, which is located adjacent to the sealant strip region on the same backing strip surface, is securely attached to the uncut surfaces of the panel and/or any nearby materials that may be present beyond the cut edge, such as primed or painted panel surfaces, aluminum plates, titanium plates, fasteners, cured sealant, seal caps, or a combination thereof. In embodiments, the pressure sensitive adhesive region of the backing strip is mostly or completely attached onto the adjacent uncut panel surfaces. After waiting for the uncured adhesive to cure 317 on the cut edges of the panel, the sealant strip is inspected 319 to ensure that the cut edge is securely sealed.

An alternative method 330 of installing an ignition-suppressing tape also includes cleaning the installation surface 331 of the desired cut edge of the polymer panel, and additionally includes applying a brush coat of sealant strip 333 to the cut edge of the panel before selecting a tape with the appropriate geometry 335 that matches the width and length of the cut edge to the desired sealant strip region of the ignition-suppressing tape. After positioning the ignition suppressing tape 337 at the desired location to be secured over both the cut edge and the adjacent uncut surfaces of the panel on either side of the cut edge, method 330 additionally applies force to the ignition-suppressing tape 339 to adhere the pressure sensitive regions of the backing strip securely onto the uncut surfaces of the panel on either side of the cut edge. Sufficient pressure can be applied towards the sealant strip region of the backing strip to allow any uncured sealant material to undergo a chemical curing process. Force can also be applied to the ignition suppressing tape to reform the uncured adhesive strip (or sealant strip) into a desired shape at the cut edge, such as using a roller to apply a particular profile to the uncured sealant material before it is cured. Wait for the uncured adhesive to cure 341, and after it is cured, remove the backing strip 343 from the sealant strip and the panel surfaces. Removal of the backings trip 343 can be done mechanically or manually by peeling off the backing strip from the panels and/or materials that it had adhered to, and would leave behind the sealant strip that is attached to the cut edge of the panel. Then, inspect 345 the cured sealant to ensure a secure seal over the cut edge.

By using the ignition-suppressing tape described herein, cut edges of polymer panels of a tank, such as an aircraft tank, can be sealed easily and quickly. This method allows the sealant strip to cure at the desired locations of the cut edges, and reduces installation time.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated examples. Finally, "exemplary" indicates the description is used as an example, rather than implying that it is an ideal. Other examples of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. An ignition-suppressing tape, comprising:
a backing strip; and
a sealant strip comprising polysulfide material and having a heat resistance of from about 70° F. and about 300° F., and a freeze resistance of between about 45° F. and about −85° F.,
wherein the sealant strip is disposed on a portion of a first surface of the backing strip;
wherein the first surface of the backing strip includes a pressure sensitive adhesive; and
wherein a peel strength of the sealant strip after curing is larger than about 20 times greater than a peel strength of the backing strip.

2. The ignition-suppressing tape of claim 1, wherein the sealant strip includes one of an uncured sealant, a fuel tank sealant, a solid-open cellular material, a composite formed by an uncured adhesive and a solid-open cellular material, or a combination thereof.

3. The ignition-suppressing tape of claim 2, wherein the uncured sealant is an uncured polysulfide sealant.

4. The ignition-suppressing tape of claim 2, wherein the solid-open cellular material is a flexible polysulfide foam.

5. The ignition-suppressing tape of claim 1, wherein the pressure sensitive adhesive is disposed on the first surface of the backing strip, adjacent to the sealant strip.

6. The ignition-suppressing tape of claim 1, wherein the sealant strip is disposed in a middle region of the first surface of the backing strip, and the pressure sensitive adhesive is disposed in other regions of the first surface of the backing strip.

7. The ignition-suppressing tape of claim 1, wherein the backing strip includes a plastic, an elastomer, a fiber reinforced plastic, a composite fiber reinforced plastic, or a combination thereof.

8. The ignition-suppressing tape of claim 1, further comprising a cured sealant disposed in between the first surface of the backing strip and the sealant strip.

9. The ignition-suppressing tape of claim 1, wherein a thickness of the sealant strip is between about 0.1 inches and about 2 inches.

10. The ignition-suppressing tape of claim 1, wherein a second surface of the backing strip is an external surface of the ignition-suppressing tape, and is smooth in contour.

11. The ignition-suppressing tape of claim 1, wherein the sealant strip includes a material that has a molecular weight of between about 1000 g/mol and about 2500 g/mol.

12. The ignition-suppressing tape of claim 1, wherein the peel strength of the sealant strip after curing is between about 15 pounds per inch width and about 60 pounds per inch width.

13. A method of installing an ignition-suppressing tape, comprising:
cleaning an installation surface, the installation surface includes at least one cut edge and at least one adjacent uncut surface of a polymer panel;
selecting an ignition-suppressing tape with an appropriate geometry, the ignition-suppressing tape including a backing strip and a sealant strip disposed on a surface of the backing strip, wherein a peel strength of the sealant strip is larger than about 20 times greater than a peel strength of the backing strip, and the sealant strip comprises a polysulfide material that has a heat resistance of between about 70° F. and about 300° F. and a freeze resistance of between about 45° F. and about −85° F.;
positioning the ignition-suppressing tape onto the installation surface;
waiting for an uncured sealant in the sealant strip to cure on the installation surface; and
inspecting the installed ignition-suppressing tape.

14. The method of claim 13 further comprising, after positioning the ignition-suppressing tape, applying force to the ignition-suppressing tape.

15. The method of claim 14, wherein applying force to the ignition-suppressing tape includes conforming the uncured sealant strip into a desired shape at the cut edge.

16. The method of claim 13 further comprising, after waiting for the uncured sealant to cure, removing the backing strip from the installation surface and the sealant strip.

17. The method of claim 16, wherein removing the backing strip involves peeling off the backing strip from the sealant strip that is attached to the cut edge of the polymer panel.

18. The method of claim 16, wherein the peel strength of the sealant strip after curing is between about 15 pounds per inch width and about 60 pounds per inch width.

19. The method of claim 13, wherein selecting the ignition-suppressing tape includes selecting a width of the sealant strip of the ignition-suppressing tape that fully covers the width of the installation surface.

20. The method of claim 13, wherein positioning the ignition-suppressing tape includes placing the sealant strip over the cut edge and the adjacent uncut surfaces of the polymer panel, and securing at least one pressure sensitive adhesive regions of the backing strip onto the adjacent uncut surfaces.

* * * * *